Figure 1:
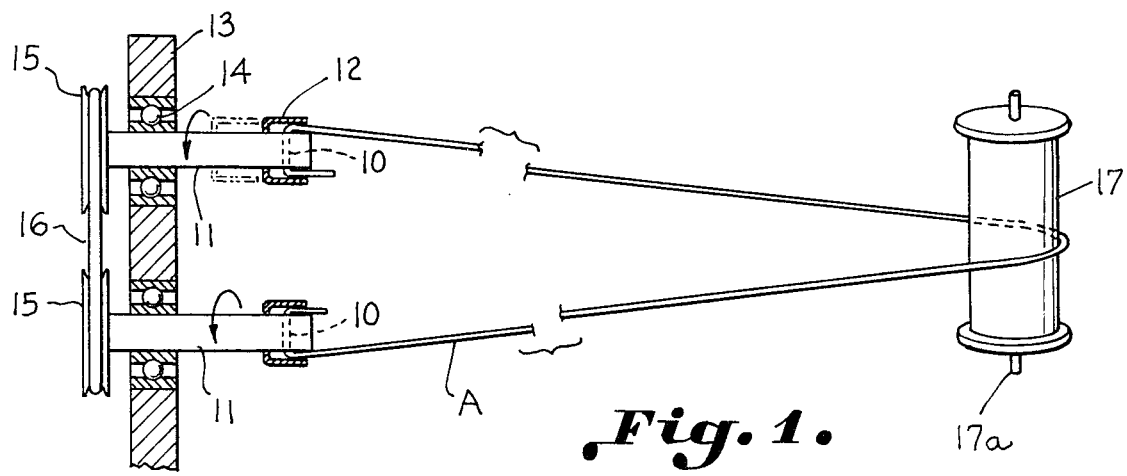

United States Patent

[11] 3,631,733

| [72] | Inventor | N. H. Thompson, Jr.<br>Anderson, S.C. |
|---|---|---|
| [21] | Appl. No. | 81,315 |
| [22] | Filed | Oct. 16, 1970 |
| [45] | Patented | Jan. 4, 1972 |
| [73] | Assignee | Superior Bands, Inc.<br>Anderson, S.C. |

[54] ELASTIC POWER TRANSMISSION BELT
6 Claims, 7 Drawing Figs.

[52] U.S. Cl. ........................................... 74/238,
57/141, 57/158
[51] Int. Cl. ........................................... G01f 3/02,
D02g 3/32
[50] Field of Search........................................... 74/231 R,
238, 239; 57/141, 158

[56] References Cited
UNITED STATES PATENTS

| 2,805,540 | 9/1957 | Thompson, Jr. | 74/238 UX |
| 2,935,838 | 5/1960 | Briscoe | 57/158 |
| 3,404,051 | 10/1968 | Hall | 74/238 X |

*Primary Examiner*—Leonard H. Gerin
*Attorney*—Bailey & Dority

ABSTRACT: An elastic power transmission belt formed from a single elongated monofilament strand of polymeric material, which is smooth and nonporous. A twist is placed in the polymeric material and the ends are joined to form a loop. A back twist is placed in the loop, and the ends of the loop are joined to form a continuous belt. The joint is carried intermediate the ends of the loop.

INVENTOR
N.H. THOMPSON, JR.
BY Bailey + Doity
ATTORNEY

ELASTIC POWER TRANSMISSION BELT

This invention relates to a power transmission belt, and more particularly to a two-ply power transmission belt constructed of polymeric material.

As is evident from applicant's earlier U.S. Pat. No. 2,805,540 granted on Sept. 10, 1057, elastic power transmission belts have been used to drive engines of various types. One reason for such is, there is no necessity of applying strong tension on the belt in order to obtain sufficient friction to drive the pulleys over which the belt passes, as is the case with nonelastic varieties. It is important that the elastic transmission belt maintains a constant tension and does not lose its elasticity. Elastic belts are particularly desirable for driving devices, such as winding spools, sewing machines, dental engines, grinders, etc. In the past elastic transmission belts have generally been constructed of a plurality of elastic strands coated with a fabric to increase the friction. The strands usually consist of a plurality of individual strands twisted together and subsequently formed into a loop which is twisted to form the belt by joining the ends thereof. Some of such elastic transmission belts are disclosed in U.S. Pat. No. 2,109,717, granted to Arnold on March 1, 1938 and U.S. Pat. No. 2,935,838, granted to Brisco on May, 10, 1960.

In applications where multistranded loops are utilized for making transmission belts one problem encountered is that if any of the individual strands break, such causes fraying which interferes with the operation of the belt.

Another problem encountered with such multistrand belts is that they tend to pick up lint and be affected by grease, oil and moisture, especially where the belts are fabric coated.

Attempts have been made to utilize a single strand of polymeric material as a power transmission belt. However, it has been found that such single strand tends to lose its elasticity after prolonged use.

Accordingly, it is an important object of the present invention to provide an elastic power transmission belt that has a relatively constant tension therein, as compared to the belt constructed of a single strand of the same material.

Another important object of the present invention is to provide an elastic power transmission belt which is not normally affected by grease, oil and moisture.

Another important object of the present invention is to provide an elastic power transmission belt that can be readily assembled from a continuous loop with a fused joint concealed in the main body of the belt.

Another important object of the present invention is to provide a method for manufacturing elastic power transmission belts of polymeric material.

The construction designed to carry out the invention will be hereinafter described, together with other features thereof.

Figure 2:
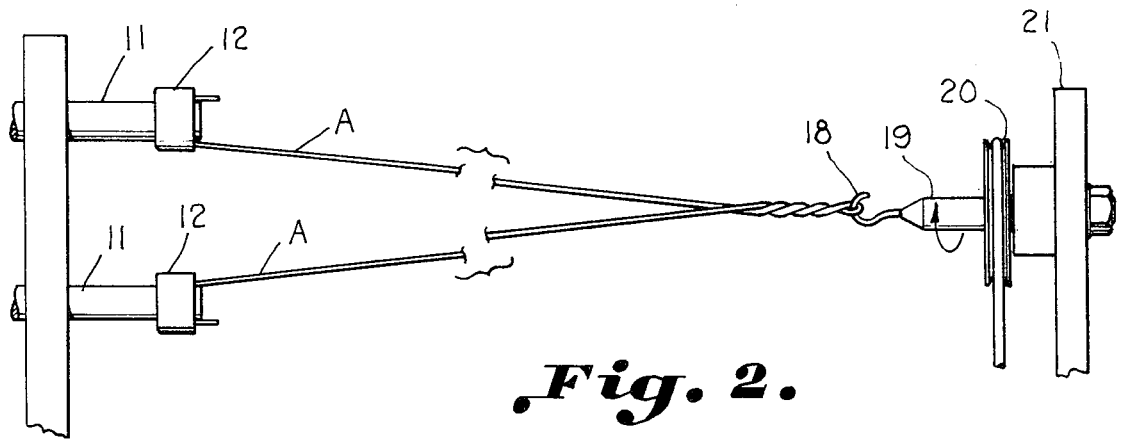
Figure 3:
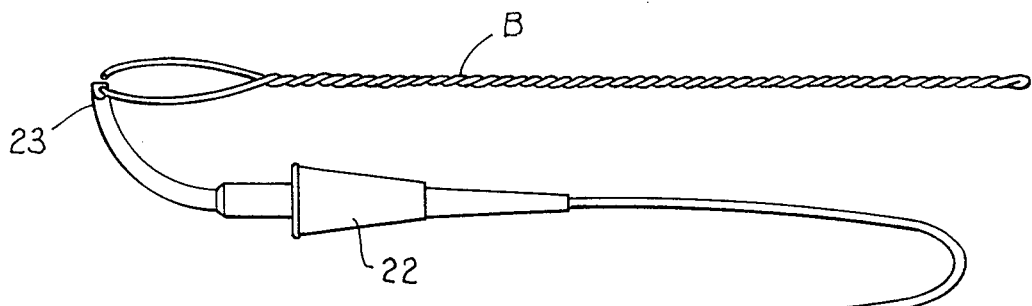
Figure 4:
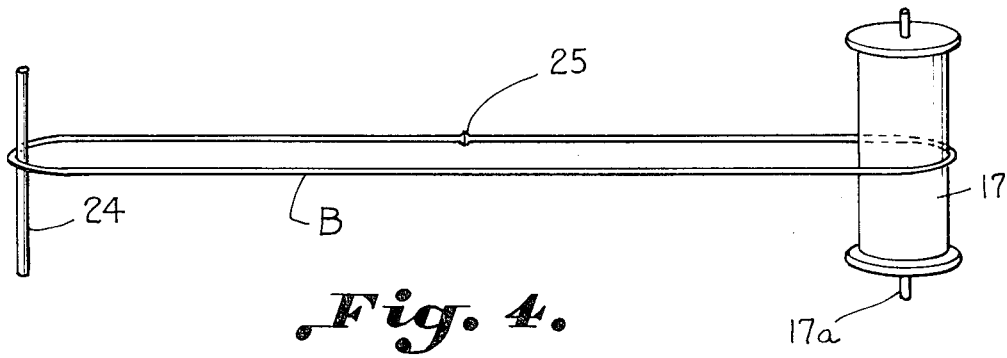
Figure 5:
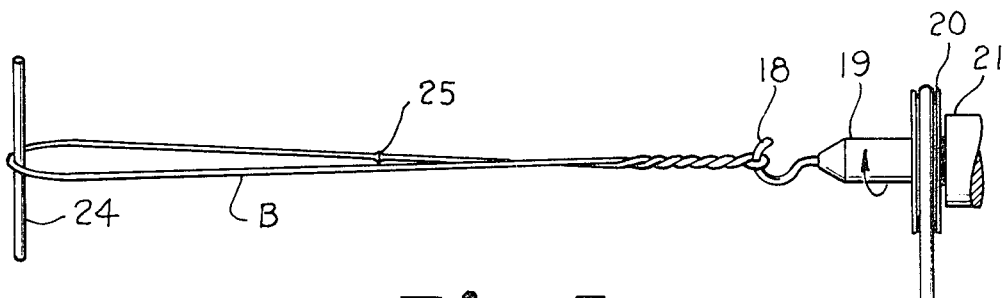
Figure 6:
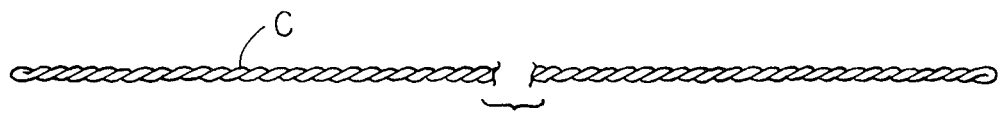
Figure 7:
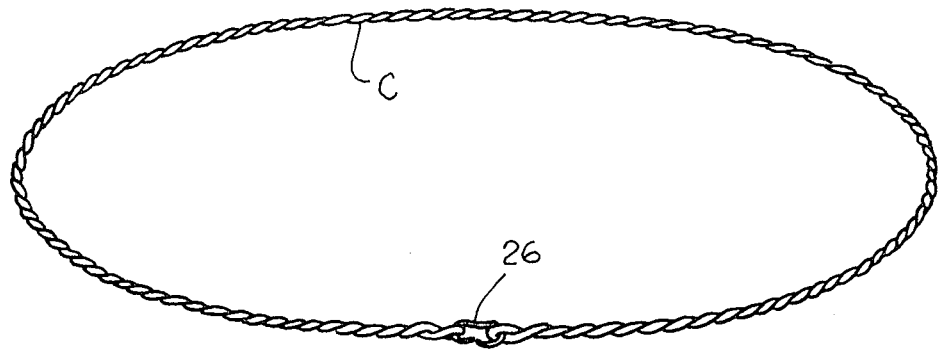

The invention will be more readily understood from a reading of the following specification, and by reference to the accompanying drawings forming a part thereof, wherein an example of the invention is shown and wherein:

FIG. 1 illustrates the first step in manufacturing an elastic power transmission belt wherein a twist is being placed in the strand, FIG. 2 illustrates the second step wherein a back twist is being placed in the strand, FIG. 3 illustrates the next step showing the ends being fused to form an elongated loop with a twist therein, FIG. 4 illustrates the step of removing the back twist from the elongated loop and shifting the fused joint into the main body of the loop, FIG. 5 illustrates the step of replacing the back twist into the loop, FIG. 6 illustrates the loop with the twist therein in completed form, and FIG. 7 illustrates the loop having its ends joined together to form the completed elastic power transmission belt.

Referring to the drawings, there is illustrated an elastic power transmission belt comprising an elongated single monofilament strand A of elastic polymeric material. The strand has a predetermined number of twists therein with its ends fused together producing an endless loop B. The endless loop is twisted in the opposite direction from the twist in the single strand producing a twisted double-ply loop C with the fused joint being located intermediate the ends of the loop. The ends of the double-ply loop are joined with a connector producing an endless belt (FIG. 7) which has less tendency to lose its elasticity under tension than if such were made of a single strand of the same material.

As previously mentioned, it is desired to produce a belt which maintains a substantially constant tension therein, and is not generally affected by grease, oil, moisture, etc. Since the belt is only a two-ply belt, it has a longer life than a multi-ply belt of the same diameter. The reason for this is that if a single filament or strand of a multi-ply belt breaks, such causes fraying and has to be removed since it may interfere with the operation of the mechanism upon which it is being used.

The drawings illustrate the sequence of steps taken in manufacturing the two-ply belts.

First, a strand A of monofilament polymeric material is selected having the desired elasticity. One particular strand is constructed of polyurethane. The elongated strand has its upper ends threaded through holes 10 in the end of rotating shafts 11 which form part of a winding mechanism. The ends of the strand are locked onto the rotating shaft 11 by the cup-shaped sleeves 12. The cup-shaped sleeves 12 have a hole extending therethrough so that such can be placed on the rotating shaft 11. The diameter of the sleeve 12 is slightly greater than the diameter of the shaft 11 so that when such is pulled to the right as shown in FIG. 1 it wedges the end of the strand A onto the shaft 11.

The shafts 11 are journaled within a suitable standard 13 on ball bearings 14. Pulleys 15 are carried on the inner end of the shafts 11, and are driven by a belt 16 so that the shafts 11 are rotated at the same speed. The belt 16 can be driven off of any suitable motor driven mechanism.

The strand A is stretched out in the form of a V with the apex thereof placed over a spool 17. The spool 17 is allowed to rotate on the vertical shaft 17a so that there is equal tension on both sides of the strand. The elongated strand illustrated in FIG. 1 is under tension so as to minimize kinking as the twists are being placed therein when rotating the shafts 11. In making one particular belt the shafts 11 are rotated 90 turns. This places 180 twists in the strand A. The number of turns placed in a particular strand depends on the particular application for which it is desired to use the strand and the ultimate length desired of the final belt.

After the initial twist has been placed in the strand the apex of the strand is shifted and placed on a rotating hook 18, as illustrated in FIG. 2. This hook 18 is carried on the end of a shaft 19, which is driven by a pulley 20 that is, in turn, driven off any suitable takeoff such as a motor. The shaft 19 is journaled in the standard 21. As indicated by the arrow in FIG. 2, the hook rotates the apex in the opposite direction from the initial twist placed therein, as illustrated in FIG. 1. In one particular instance the hook 18 is rotated 22 times to place a back twist in the strand. This presents the strand from kinking when it is removed from the rotating shafts 11 and hook 18. The free ends of the strand A are then fused together with a heating iron 22 to form a joint 25. The heating iron can be any conventional heating iron as long as it generates enough heat on its tip 23 to melt the ends of the strand A. After the ends have been melted they are brought in contact and allowed to cool to form the fused joint 25, producing an elongated loop. The elongated loop is then placed between the spool 17 and a rod 24 for removing the back twist therefrom. The fused joint 25 is shifted intermediate the ends of the loop, such as illustrated in FIGS. 4 and 5. The end of the loop carried on the spool 17 is then removed and again placed on the hook 18, while the other end is held stationary by the rod 24. A back twist of approximately five turns is then placed into the loop forming the elongated loop with the twist therein, such as illustrated in FIG. 6. A sufficient number of turns are placed in the loop during the operation illustrated in FIG. 5 so as to prevent the loop from kinking when removed from the hook 18 and rod 24. The ends of the loop are then joined by any suitable connector, such as a metal clip 26, thus producing a double-ply belt. The double-ply belt maintains a constant tension therein as compared to a single strand of polyurethane of substantially the same diameter. It, also, has a longer life than multifilament belts, since if a single strand of a multifilament belt breaks, such interferes with the operation of the belt and frequently causes fraying. Another problem eliminated by the subject invention as compared to multistrand belts, is that the subject invention eliminates the step of winding a single strand into a multiloop strand such as illustrated in the applicant's earlier U.S. Pat. No. 2,805,540.

The surface of the polyurethane belt is smooth and nonporous, and as a result is not affected by grease, oil, moisture, etc. As a result of its smoothness it picks up very little lint in operation. Also, there is no finishing treatment required as in the case of fabric elastic belts wherein such are treated with a protective coating.

While a preferred embodiment of the invention has been described using specific terms, such description is for illustrative purposes, and it is to be understood that changes and variations may be made without departing from the spirit or scope of the following claims.

What is claimed is:

1. An elastic power transmission belt comprising: an elongated single monofilament strand of elastic polymeric material, said strand having a predetermined number of twists therein, said strand having its ends fused together producing an endless loop with a fused joint therein, said endless loop being twisted in an opposite direction from the twist in said single strand producing a twisted double-ply loop with said fused joint being located intermediate the ends of the loop, and means for joining the ends of said double-ply loop, whereby said endless belt has less tendency to lose its elasticity under tension than said single strand.

2. The elastic power transmission belt as set forth in claim 1, wherein said polymeric material is polyurethane.

3. The elastic power transmission belt as set forth in claim 1, wherein said strand of elastic polymeric material has a smooth nonporous surface.

4. The method of making a power transmission belt having high retention of elasticity comprising: selecting a single monofilament elastic strand of polymeric material, attaching the ends of said elastic strand to a winding mechanism and extending the central portion of said strand so that said strand is an elongated V, placing the apex from rotating, rotating said winding mechanism for placing a twist in said strand, removing said apex from said retaining member and rotating said apex in an opposite direction from the direction of twist in said strand for placing a back twist therein while maintaining said winding mechanism stationary, fusing the ends of said strand together forming an elongated loop, removing said back twist from said loop, shifting said fused ends intermediate the ends of said elongated loop, rotating one end of said loop replacing said back twist, and joining the ends of said loop producing a double-ply belt.

5. The method of making a power transmission belt as set forth in claim 3 further comprising: allowing said retaining member over which the apex of said V is placed to rotate freely as said twist is being placed in said strand by said winding mechanism.

6. The method of making a power transmission belt having a high retention of elasticity comprising: selecting a single monofilament elastic strand of polymeric material, attaching the ends of said elastic strand to a winding mechanism, extending the central portion of said strands so that said strand is an elongated V, placing the apex of said V over a retaining member for holding said apex and maintaining said strand under tension, rotating said winding mechanism for placing a twist in said strand, removing said ends from said winding mechanism, fusing the ends of said strand together forming an elongated loop, shifting said fused ends intermediate said loop for placing a back twist therein, and joining the ends of said loop producing a double-ply belt.

* * * * *